United States Patent
Shimizu et al.

(10) Patent No.: US 10,762,346 B2
(45) Date of Patent: Sep. 1, 2020

(54) LEDGER DOCUMENT PROCESSING DEVICE, LEDGER DOCUMENT PROCESSING METHOD AND STORAGE MEDIUM

(71) Applicant: CASIO COMPUTER CO., LTD., Tokyo (JP)

(72) Inventors: Nobuhiro Shimizu, Hino (JP); Ryo Oe, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 144 days.

(21) Appl. No.: 15/905,966

(22) Filed: Feb. 27, 2018

(65) Prior Publication Data
US 2018/0276461 A1 Sep. 27, 2018

(30) Foreign Application Priority Data
Mar. 21, 2017 (JP) ................. 2017-054222

(51) Int. Cl.
*G06K 9/00* (2006.01)
*H04N 5/272* (2006.01)
(Continued)

(52) U.S. Cl.
CPC ......... *G06K 9/00463* (2013.01); *G06K 7/015* (2013.01); *G06K 7/1413* (2013.01);
(Continued)

(58) Field of Classification Search
CPC .......... G06K 9/00463; G06K 9/00449; G06K 9/2081; G06K 9/183; G06K 7/015;
(Continued)

(56) References Cited

U.S. PATENT DOCUMENTS 8,254,721 B2   8/2012   Tamura
9,846,857 B2   12/2017   Stout et al.
(Continued)

FOREIGN PATENT DOCUMENTS

GB   2538285 A   11/2016
JP   H11-349114 A   12/1999
(Continued)

OTHER PUBLICATIONS

Extended European Search Report dated Jul. 19, 2018 received in European Patent Application No. EP18158251.1.
Notification of Reasons for Refusal dated Aug. 6, 2019 received in Japanese Patent Application No. JP 2017-054222 together with an English language translation.

*Primary Examiner* — John W Lee
(74) *Attorney, Agent, or Firm* — Scully Scott Murphy & Presser

(57) ABSTRACT

A ledger document processing device including a display section which displays a live view image captured by an imaging section while waiting for a ledger document to be captured, and a processor which actualizes functions including judging whether a pixel-count size of an area corresponding to the ledger document in an image to be captured and stored in response to an imaging instruction is equal to or larger than a reference pixel-count size while waiting for the ledger document to be captured, notifying a user of a judgment result, and storing in a storage section the image captured by the imaging section in response to the imaging instruction.

17 Claims, 12 Drawing Sheets

(51) Int. Cl.
  *G06K 9/20* (2006.01)
  *G06K 9/18* (2006.01)
  *G06K 7/015* (2006.01)
  *G06K 7/14* (2006.01)
  *G06K 9/32* (2006.01)
  *H04N 5/232* (2006.01)

(52) U.S. Cl.
  CPC ....... *G06K 7/1447* (2013.01); *G06K 9/00449* (2013.01); *G06K 9/183* (2013.01); *G06K 9/2081* (2013.01); *G06K 9/32* (2013.01); *H04N 5/23222* (2013.01); *H04N 5/23293* (2013.01); *H04N 5/272* (2013.01)

(58) Field of Classification Search
  CPC ...... G06K 7/1413; G06K 7/1447; G06K 9/32; G06K 7/10722; H04N 5/23222; H04N 5/23293; H04N 5/272
  See application file for complete search history.

(56) References Cited

U.S. PATENT DOCUMENTS

| | | | |
|---|---|---|---|
| 9,858,460 B2 | 1/2018 | Hoobler et al. | |
| 2004/0257380 A1* | 12/2004 | Herbert | H04N 1/3875 345/619 |
| 2010/0303382 A1* | 12/2010 | Tamura | H04N 1/00795 382/278 |
| 2015/0356336 A1 | 12/2015 | Hoobler et al. | |
| 2016/0371633 A1 | 12/2016 | Stout et al. | |
| 2017/0032311 A1 | 2/2017 | Rizzolo et al. | |
| 2018/0068264 A1 | 3/2018 | Stout et al. | |

FOREIGN PATENT DOCUMENTS

| | | |
|---|---|---|
| JP | 2002-176509 A | 6/2002 |
| JP | 2005-122609 A | 5/2005 |
| JP | 2010-277168 A | 12/2010 |
| JP | 2016-076093 A | 5/2016 |

* cited by examiner

FIG. 1A
FIG. 1B
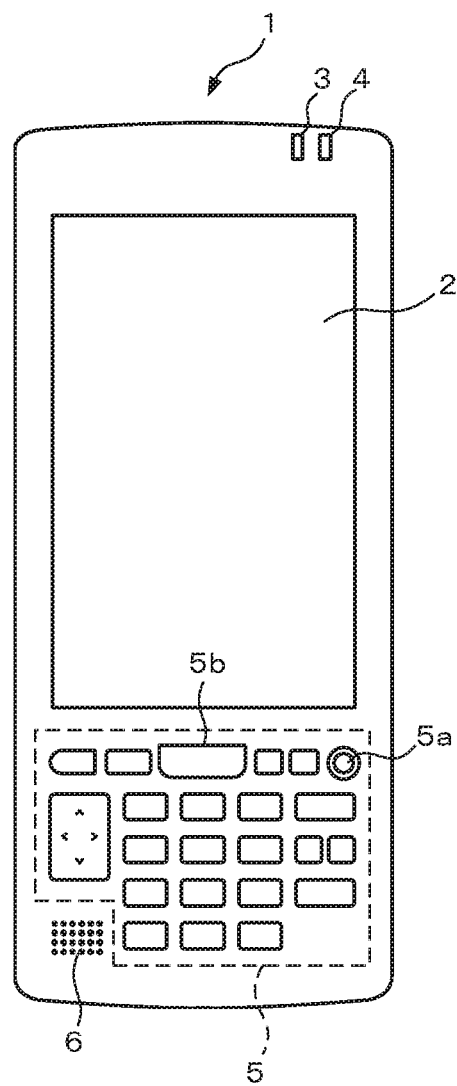
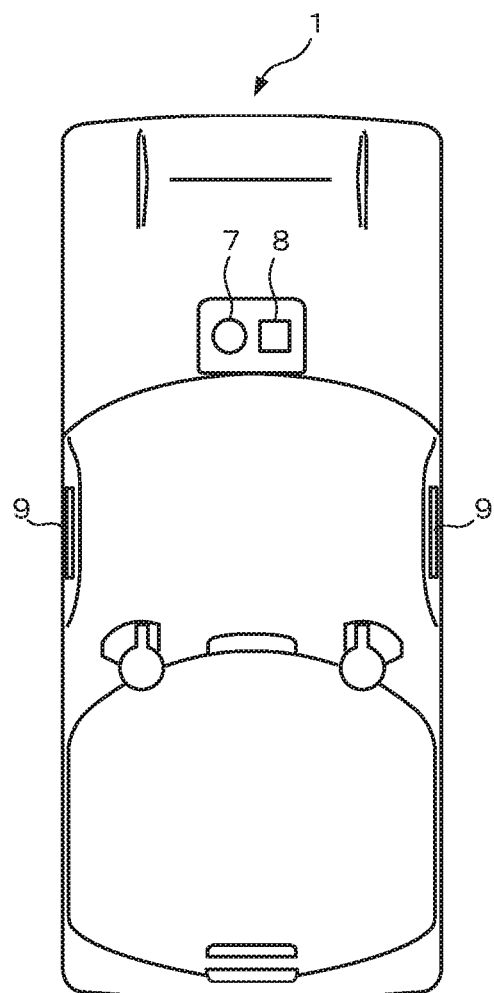

LEDGER DOCUMENT PROCESSING DEVICE, LEDGER DOCUMENT PROCESSING METHOD AND STORAGE MEDIUM

CROSS-REFERENCE TO RELATED APPLICATION

This application is based upon and claims the benefit of priority from the prior Japanese Patent Application No. 2017-054222, filed Mar. 21, 2017, the entire contents of which are incorporated herein by reference.

BACKGROUND OF THE INVENTION

1. Field of the Invention

The present invention relates to a ledger document processing device, ledger document processing method and storage medium.

2. Description of the Related Art

Conventionally, a handy terminal that serves as a slip processing device for business use has been known. For example, there is a handy terminal that includes a barcode scanner and a camera and acquires, from each slip, identification information included in a barcode printed on the slip and image information regarding an image of the slip captured by the camera.

Also, as a method for associating identification information included in a barcode printed on a slip with image information acquired by image capturing by a digital camera for data management, a management method is known in which a barcode is first readout by a barcode scanner so as to acquire identification information and then an image of a target is captured by a digital camera so as to associate the identification information with the image information (for example, refer to Japanese Patent Application Laid-Open (Kokai) Publication No. 11-349114).

In the Electronic Books Maintenance Act, ledger documents such as receipts, statements of delivery, slips, and invoices are permitted to be read out by a scanner and stored as image information. In recent years, by the relaxation of requirements of image information acquirement under law revisions, it is permitted to use a smartphone, digital camera, or the like to acquire image information regarding a ledger document if a stipulated resolution is satisfied.

However, in a case where a slip processing device such as a handy terminal is used to capture images of slips to store the slips as image information, the resolutions of the image information are not consistent depending on the imaging distances, the viewing angles, and the like. In addition, it is difficult for the user to evaluate the resolutions. That is, it is difficult to ensure the stipulated resolution for final image information to be recorded.

SUMMARY OF THE INVENTION

In accordance with one aspect of the present invention, there is provided a ledger document processing device comprising: a display section which displays a live view image captured by an imaging section while waiting for a ledger document to be captured; and a processor which actualizes functions comprising: judging whether a pixel-count size of an area corresponding to the ledger document in an image to be captured and stored in response to an imaging instruction is equal to or larger than a reference pixel-count size while waiting for the ledger document to be captured; notifying a user of a judgment result; and storing in a storage section the image captured by the imaging section in response to the imaging instruction.

In accordance with another aspect of the present invention, there is provided a ledger document processing method comprising: displaying a live view image captured by an imaging section while waiting for a ledger document to be captured; judging whether a pixel-count size of an area corresponding to the ledger document in an image to be captured and stored in response to an imaging instruction is equal to or larger than a reference pixel-count size while waiting for the ledger document to be captured; notifying a user of a judgment result; and storing the image captured by the imaging section in response to the imaging instruction.

In accordance with another aspect of the present invention, there is provided a non-transitory computer-readable storage medium having stored thereon a program that is executable by a computer in a ledger document processing device to actualize functions comprising: displaying a live view image captured by an imaging section on a display section while waiting for a ledger document to be captured; judging whether a pixel-count size of an area corresponding to the ledger document in an image to be captured and stored in response to an imaging instruction is equal to or larger than a reference pixel-count size while waiting for the ledger document to be captured; notifying a user of a judgment result; and storing in a storage section the image captured by the imaging section in response to the imaging instruction.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more clearly understood by the detailed description below being considered together with the following drawings.

FIG. 1A and FIG. 1B are external views of a slip processing device according to a first embodiment, of which FIG. 1A is a front view and FIG. 1B is a rear view;

DETAILED DESCRIPTION OF THE PREFERRED EMBODIMENTS

A. First Embodiment

Figure 2:
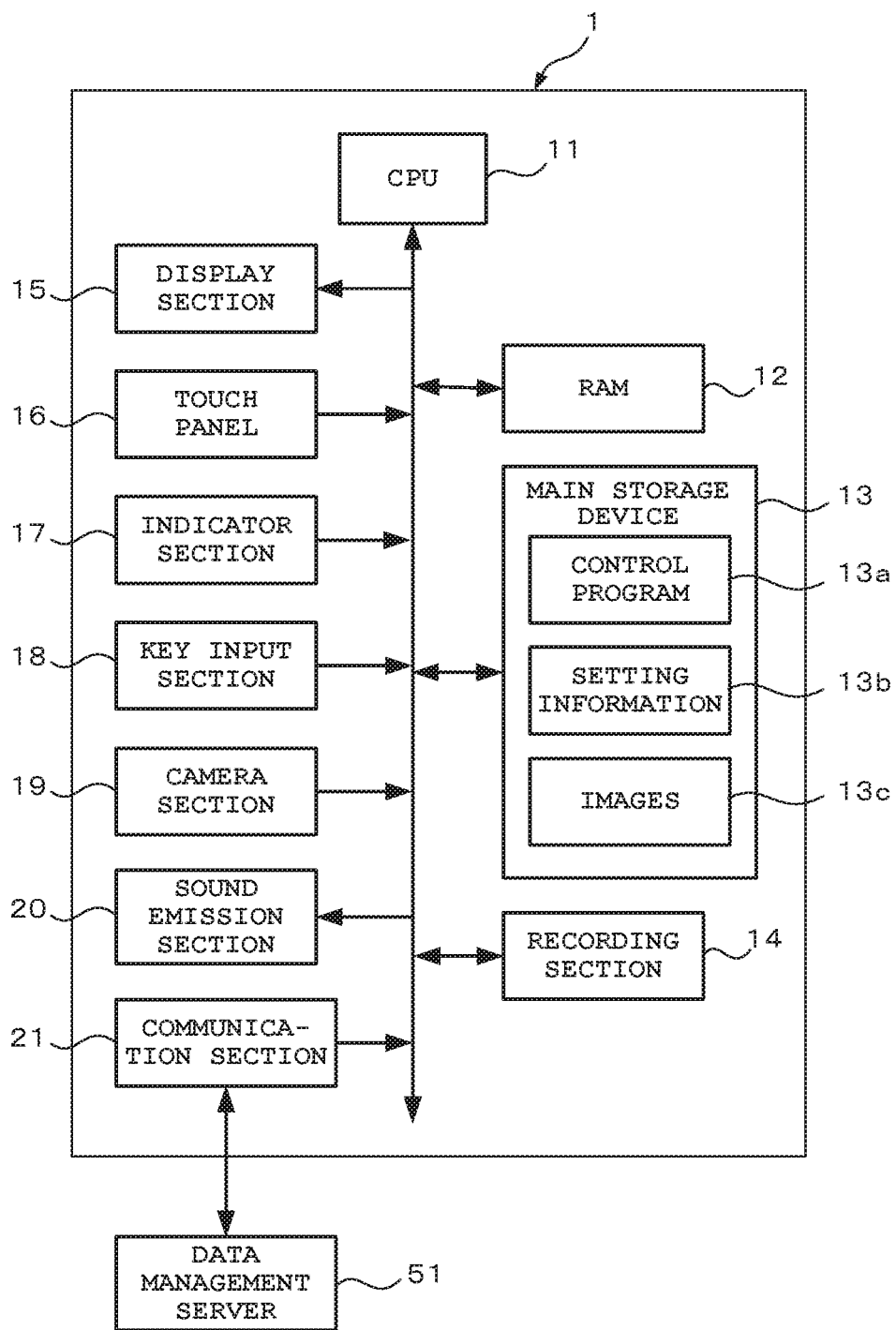
FIG. 2 is a block diagram of the electrical structure of the slip processing device.

A first embodiment of the present invention will hereinafter be described. FIG. 1A and FIG. 1B are external views of a slip processing device 1 according to the first embodiment. FIG. 1A is a front view of the slip processing device 1, and FIG. 1B is a rear view of the slip processing device 1.

The slip processing device 1 is a handy terminal having functions for capturing images of slips, storing the captured images, and acquiring identification information indicated by barcodes on the slips from the captured images.

The slip processing device 1 is not limited to the handy terminal, and may be any of other information terminal devices such as a tablet PC, note PC, PDA (Personal Digital Assistant), smartphone, and portable telephone.

As shown in FIG. 1A, the slip processing device 1 has a display 2, a first indicator 3, a second indicator 4, an operation key group 5, and a loudspeaker 6 provided on the front side.

The display 2 performs screen display of various pieces of information. In addition, it is used for the operation of the slip processing device 1 or data input thereon by an attached stylus. The first indicator 3 and the second indicator 4 are LEDs (Light Emitting Diodes) which can emit light in a plurality of colors as required. The first indicator 3 is lit in a color in accordance with the state of the power supply of the slip processing device 1. The second indicator 4 is lit in green or red when identification information indicated by a barcode and slip image information are acquired.

The operation key group 5 is constituted by a plurality of keys including a power supply key 5a and a center trigger key 5b. The center trigger key 5b is used for slip imaging instructions. Note that these plurality keys (reference numerals thereof are omitted in the drawing) constituting the operation key group 5 also include a function key, numerical keys, and the like, which are used in various operations of the slip processing device 1.

Also, on the rear side of the slip processing device 1, a camera 7 for capturing images of slips and an LED light 8 are provided, as shown in FIG. 1B. This camera 7 has an AF (Auto Focus) function. Moreover, on the side surfaces of the slip processing device 1, side trigger keys 9 provided which are used in slip imaging instructions as with the center trigger key 5b.

FIG. 2 is a block diagram of the electrical structure of the slip processing device 1. The slip processing device 1 is constituted by a CPU (Central Processing Unit) 11, a RAM (Random Access Memory) 12 connected to the CPU 11, a main storage device 13, a recording section 14, a display section 15, a touch panel 16, an indicator section 17, a key input section 18, a camera section 19, a sound emission section 20, and a communication section 21.

The main storage device 13 is constituted by a rewritable non-volatile memory such as a flash memory incorporated in the slip processing device 1. Allocated in the main storage device 13 are a control program area 13a where a control program is stored, a setting information area 13b where various pieces of setting information set by a user regarding the operation of the slip processing device 1 are stored, and an image area 13c where captured images are temporarily stored.

Here, the slip processing device 1 supports plural types of slips, and the setting information area 13b has stored therein information of plural types of slips (hereinafter referred to as slip information) set in advance by the user. Also, the setting information area 13b has stored therein various pieces of setting information including information of imaging target slips set in advance by the user and information regarding the operation of the slip processing device 1.

The CPU 11 reads out the control program from the main storage device 13, loads it into the RAM 12, and controls the operation of the slip processing device 1 based on this loaded control program.

The display section 15 is constituted by the display 2 and its drive circuit. The display 2 is, for example, an LCD (Liquid Crystal Display) or an ELD (Electro Luminescent Display). The touch panel 16 is a pressure-sensitive or electrostatic touch panel integrally provided on the surface of the display 2, and supplies the CPU 11 with information regarding operations by the user.

The indicator section 17 is constituted by LEDs constituting the first indicator 3 and the second indicator 4 and their drive circuits. This indicator section 17 also includes the LED light 8 and its drive circuit. The key input section 18 is constituted by a plurality of keys such as the center trigger key 5b, and supplies the CPU 11 with information regarding operations by the user who is using the slip processing device 1.

The camera section 19 is constituted by an image sensor, an image processing engine which processes analog signals and digital signals, and a drive circuit which drives an imaging lens at the time of AF. The image sensor is, for example, a CMOS (Complementary Metal Oxide Semiconductor) or a CCD (Charge Coupled Device), and its effective pixels are approximately five million (2592 dots×1944 dots).

The recording section 14 is constituted by, for example, various memory cards that are attachable and detachable to and from the slip processing device 1 and a card interface allowing the input and output of data to and from these memory cards. In the recording section 14, slip data is stored as needed, which includes a slip image acquired by cutting out a slip portion from a captured image showing a slip, that is, image information regarding the slip, and identification information acquired from a barcode thereon.

The sound emission section 20 is constituted by a voice generation circuit, an amplifier, and the loudspeaker 6, and emits various notification sounds as required. The communication section 21 performs communication with an external data management server 51 by wired or wireless communication as required, and transmits slip data of a plurality of slips stored (saved) in the recording section 14.

The data management server 51 is a computer which manages a large amount of slip data supplied from a plurality of slip processing devices 1, and the slip data is supplied to the data management server 51 by communication by the communication section 21. Note that, by a memory card as well, slip data can be supplied to the data management server 51. Also, communications between the slip processing device 1 and the data management server 51 can also be performed by an arbitrary communication network.

The slip processing device 1 is provided with a plurality of operation modes including a slip imaging mode for imaging slips, acquiring slip images, barcode identification information, and slip data, and storing them in the recording section 14, and a data output mode for outputting the slip data stored in the recording section 14 to an external information processing device via the communication section 21.

Figure 3:
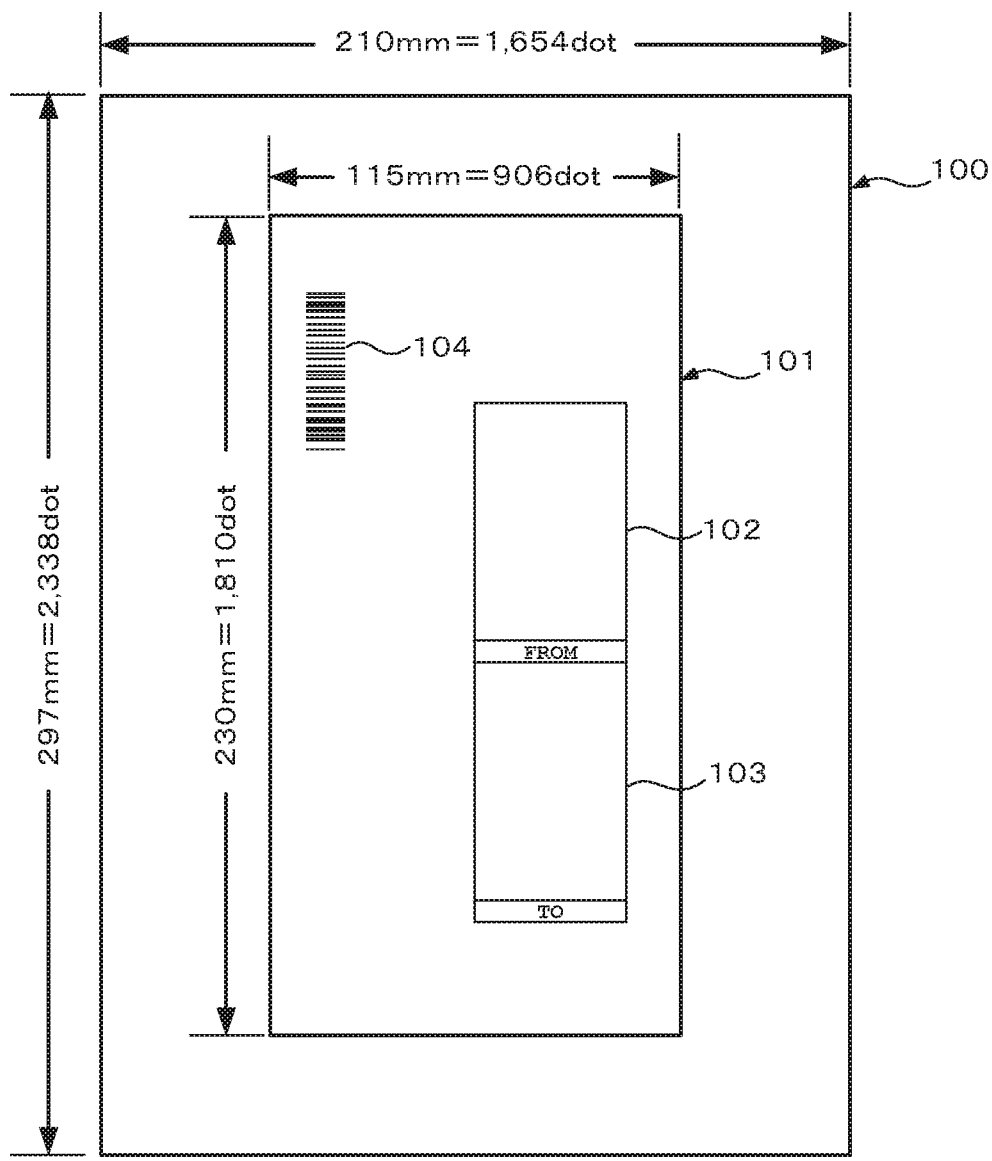
FIG. 3 is a diagram showing an example of a slip to be imaged.

Next, a slip to be imaged by the slip processing device 1 is described. FIG. 3 is a diagram showing an example of a slip 101 to be imaged, which is a delivery slip for use by a courier. This slip 101 has a laterally-elongated rectangular shape, and its lower side has a sender field 102 where the address, name, and the like of a sender who is a delivery source are written, and a delivery destination field 103 where the address, name, and the like of a delivery destination are written. Its upper-right portion has a barcode 104 indicating identification information allocated to this slip 101.

Here, the actual size of a general slip is smaller than the size of an A4 paper sheet 100 (297 mm in length×210 mm in width). For example, it is 115 mm in height×230 mm in width, as shown in FIG. 3.

In a case where the slip 101 is imaged so as to store a slip image, it is required to ensure a predetermined resolution stipulated by the Electronic Books Maintenance Act for that slip image. This resolution stipulated by the Electronic Books Maintenance Act is equal to or more than 200 dots for 25.4 mm (one inch), that is, equal to or more than 200 dpi.

In the case of a resolution of 200 dpi, the size of the number of pixels of an image of the A4-size paper sheet 100 is 2,338 dots in length and 1,654 dots in width, and the total number of pixels is 3,867,052. Also, when the slip 101 has an actual size shown in FIG. 3, the size of the number of pixels of its slip image is 906 dots in length and 1810 dots in width, and the total number of pixels is 1,639,860. Accordingly, any structure capable of recording an image of a total number of pixels of four million can support general slips such as the slip 101 exemplarily illustrated in FIG. 3.

In the setting information area 13b of the main storage device 13, minimum numbers of slip image pixels in a lengthwise direction and a lateral direction required to store the slip 101 as a slip image of 200 dpi, that is, a reference pixel-count size, and information regarding the position of the barcode 104 on the slip 101 are stored as slip information together with the actual size (lengthwise dimension and lateral dimension).

Note that the above-described reference size is the number of pixels when the maximum number of pixels (five million pixels) has been set as the number of pixels for an image of the slip 101. Also, the information regarding the position of the barcode 104 indicates the written area of the barcode 104 on the slip 101 with reference to, for example, the upper-right corner of this slip 101.

Figure 4:
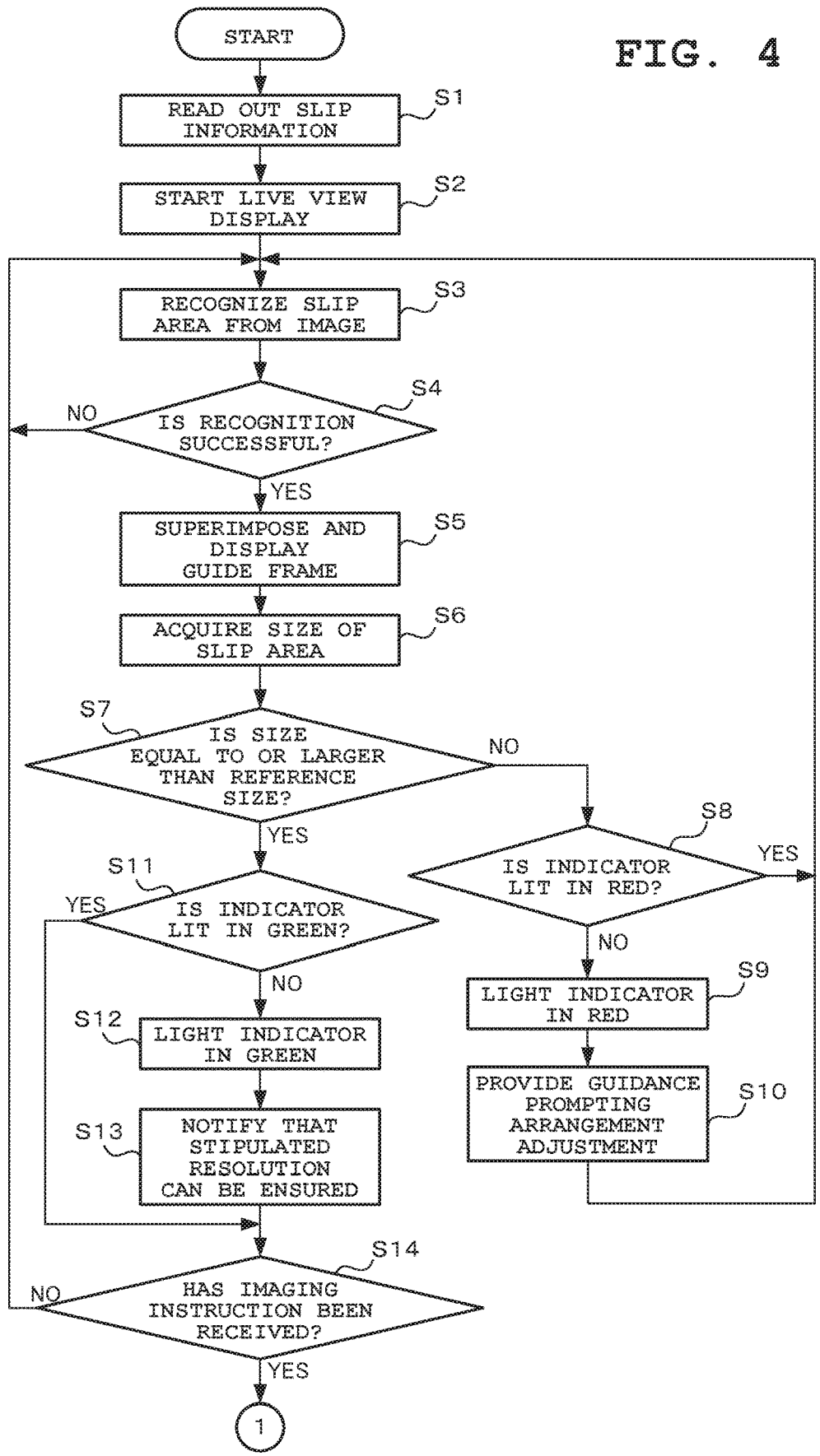
FIG. 4 is a flowchart of processing in a slip imaging mode.
Figure 5:
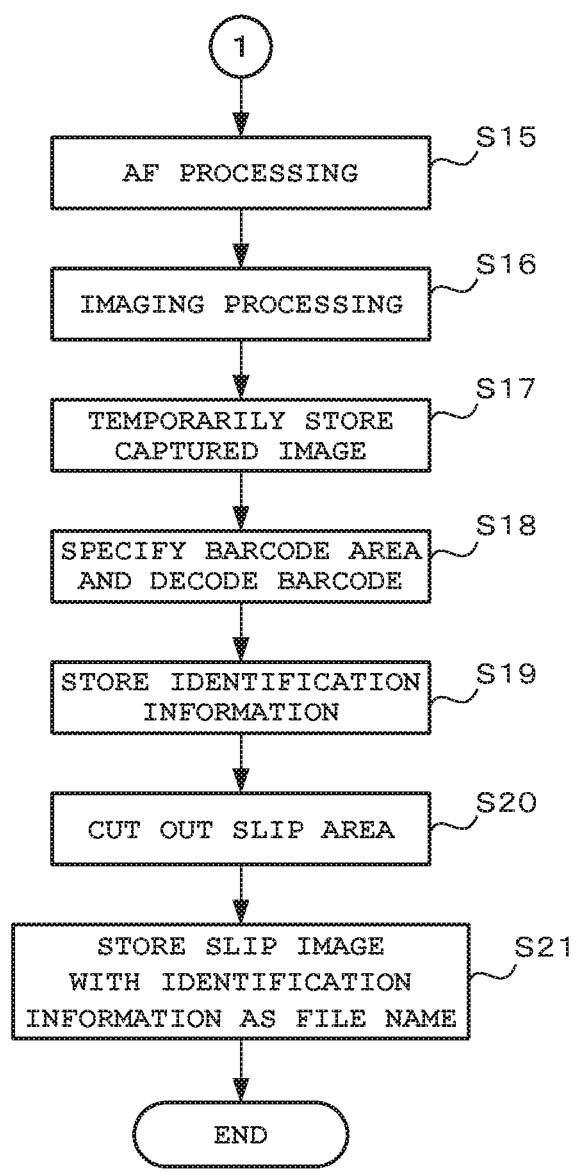
FIG. 5 is a flowchart following that of FIG. 4.

Next, the operation of the slip processing device 1 according to the present invention will be described when a user thereof uses the slip processing device 1 to capture an image of a slip. FIG. 4 and FIG. 5 are flowcharts of processing in the slip imaging mode that is executed by the CPU 11 by following the control program stored in the main storage device 13 (control program area 13a) upon power-up.

In the slip imaging mode, the CPU 11 immediately reads out the slip information of a slip specified in advance as an imaging target from the main storage device 13 (setting information area) (Step S1). In addition, the CPU 11 performs live view display, that is, starts to control the camera section 19 to capture images at a predetermined frame rate (for example, fps), and displays the captured images (hereinafter referred to as "live view image") on the display 2 (Step S2).

Figure 6A:
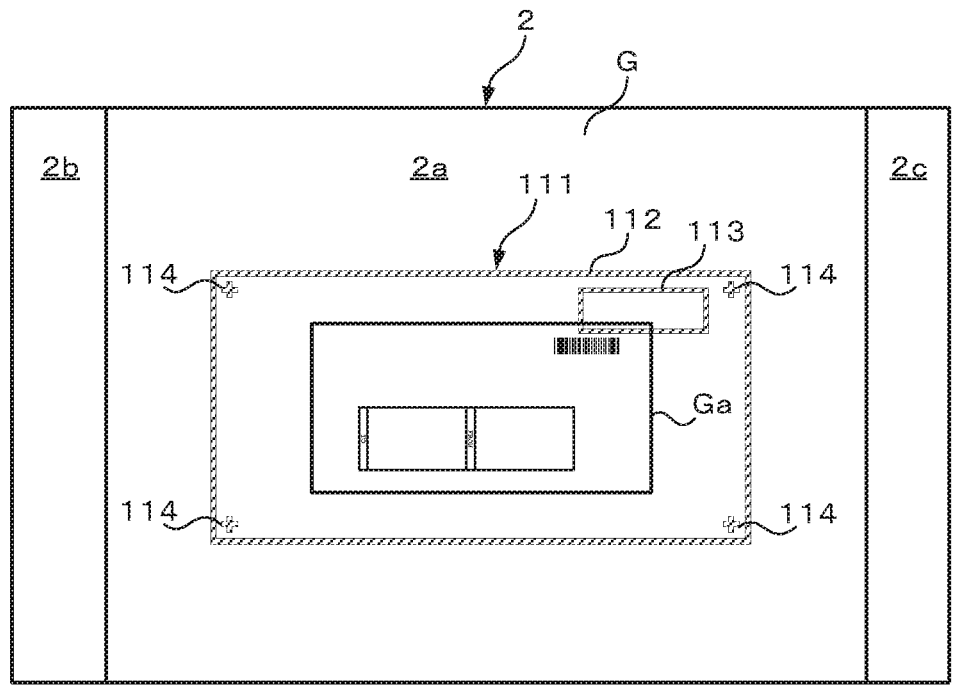
FIG. 6A and FIG. 6B are diagrams each showing an example of a live view image when the size of a slip area is smaller than a reference size.
Figure 6B:
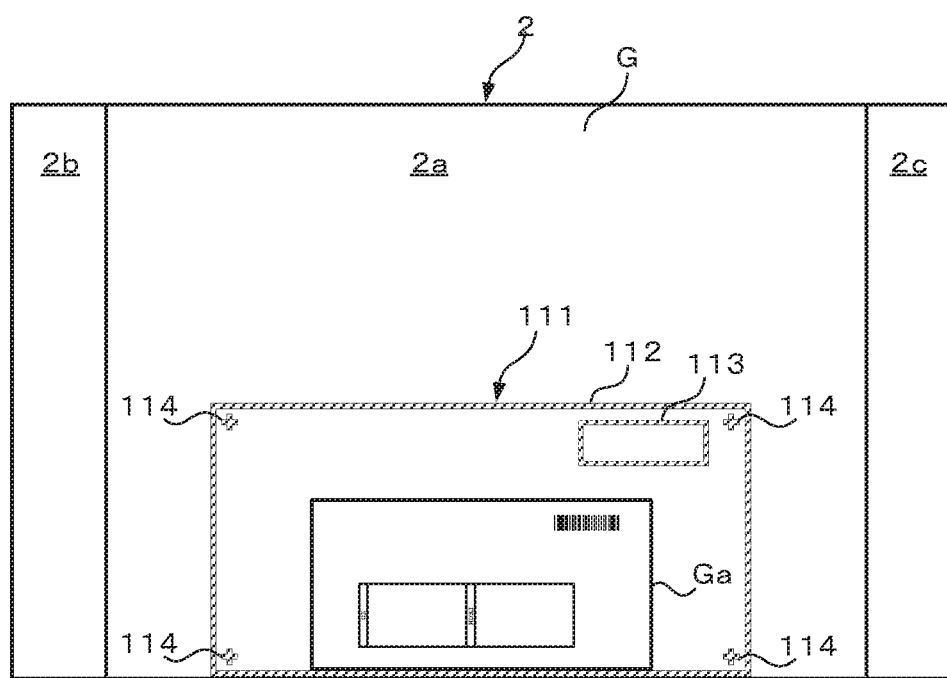

Note that the slip processing device 1 of the present embodiment has been designed to be used in a landscape state at the time of image capturing. The live view image G is displayed in a screen center area 2a of the display 2. On other screen areas 2b and 2c of the display 2, information (not shown) other than the live view image G is displayed, as shown in FIG. 6A and FIG. 6B.

Next, the CPU 11 recognizes an area Ga corresponding to the slip 101 (hereinafter referred to as "slip area") from the live view image G for each frame (or several frames) sequentially captured (Step S3). The recognition of the slip area Ga is performed by, for example, performing edge detection or linear recognition on the live view image G, detecting a plurality of rectangular areas sectioned along a plurality of recognized straight lines, and specifying a rectangular area having the maximum area as the slip area Ga. Note that the specification of the slip area Ga may be performed based not only on the areas of the plurality of rectangular areas but also color information of each area.

Then, the CPU 11 judges whether the slip area Ga has been recognized, that is, whether the recognition of the slip area Ga is successful (Step S4). Here, until the slip area Ga is recognized, the CPU 11 repeatedly performs this recognition processing on new frames of the live view image G (NO at Step S4). Once the slip area Ga is recognized (YES at Step S4), the CPU 11 uses an OSD (On Screen Display) function to superimpose a guide frame 111 on a predetermined point on the live view image G (Step S5). Here, the CPU 11 sets the display position of the guide frame 111 such that the center of the display position coincides with the center of the slip area Ga. Here, if the entire guide frame 111 cannot be displayed within the live view image G, the CPU 11 adjusts the display position of the guide frame 111 such that it is positioned close to the slip area Ga within a range where the entire guide frame 111 can be displayed, as shown in FIG. 6B.

The guide frame 111 is constituted by a rectangular slip frame 112, a rectangular barcode frame 113, and four slip detection points 114 arranged at the four corners of the slip frame 112.

The slip frame 112 is a frame circumscribed on a rectangular area having a reference size indicated by the slip information, and indicates on the live view image G the minimum size of the slip 101 that can be recorded at a stipulated resolution.

The barcode frame 113 is a frame indicating an area where the barcode 104 is positioned when an inner area within the slip frame 112 coincides with the slip area Ga. The slip detection points 114 at the four corners are marks for assisting a size adjustment task for adjusting the size of the slip 101 in the live view image G when the user captures an image of the slip 101.

Then, the CPU 11 acquires the size (the numbers of pixels in the lengthwise and lateral directions) of the slip area Ga (Step S5), and judges whether the size is equal to or larger than the reference pixel-count size (hereinafter referred to as "reference size") indicated by the slip information so as to judge whether the number of the pixels in each of the lengthwise and lateral directions is equal to or larger than a reference number of pixels (Step S6). That is, the CPU 11 judges whether the slip area Ga can be recorded at the stipulated resolution or a higher resolution when image capturing is performed at this point.

Here, when the size of the slip area Ga is not equal to or larger than the reference size, that is, the number of the pixels in one of the lengthwise and lateral directions is smaller than the reference number of pixels (NO at Step S7), the CPU 11 performs the following processing.

First, the CPU 11 judges whether the second indicator 4 (simply mentioned as indicator in FIG. 4) has been lit in red (Step S8). When the second indicator 4 has not been lit in red (NO at Step S8), the CPU 11 lights up the second indicator 4 in red (Step S9). In addition, the CPU 11 causes the sound emission section 20 to output audio guidance that prompts the user to adjust the size of the slip 101 on the live view image G, that is, the viewing angle and the imaging distance (Step S10). This audio guidance is a message such as "Please take a larger image of the slip". Here, the CPU 11 may guide the user by displaying guidance prompting the adjustment of the viewing angle and the imaging distance on the display section 15.

Also, the CPU 11 may guide the user by causing the sound emission section 20 to output the audio guidance and displaying the guidance on the display section 15.

Then, the CPU 11 returns to the processing at Step S3 to repeat it and the processing thereafter. As a result, the guide frame 111 is moved following the slip area Ga. While the size of the slip area Ga is smaller than the reference size (NO at Step S7), the CPU 11 maintains the lighting of the second indicator 4 in red (YES at Step S8).

Figure 7:
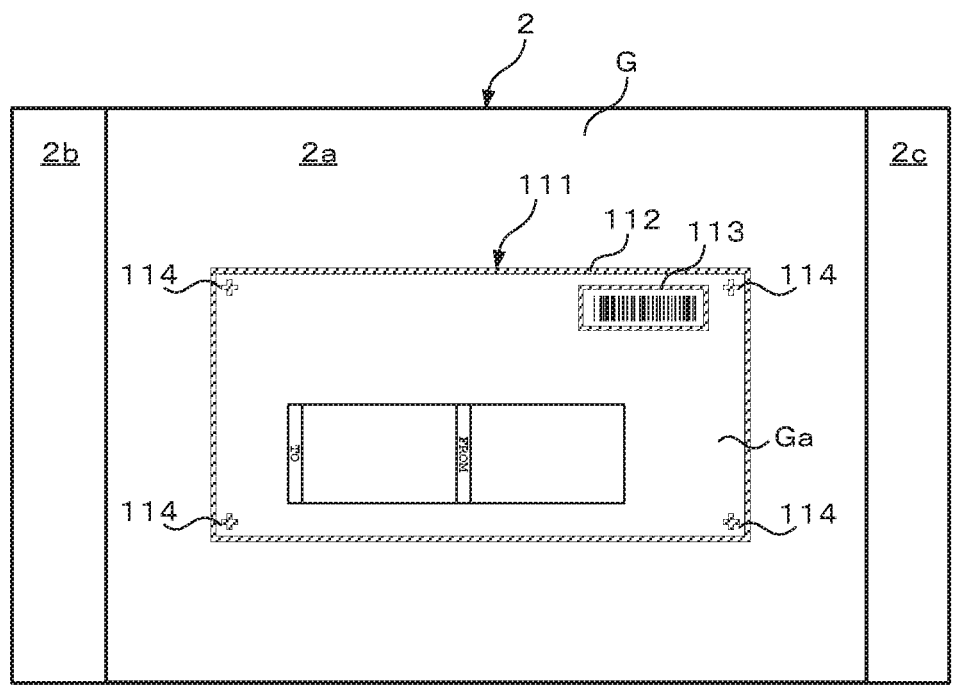
FIG. 7 is a diagram showing an example of a live view image when the size of the slip area is equal to or larger than the reference size.

Then, when the size of the slip area Ga becomes equal to or larger than the reference size by the adjustment of the size of the slip 101 by the user (YES at Step S7), the CPU 11 performs the following processing. FIG. 7 shows an example of the live view image G when the size of the slip area Ga is equal to or larger than the reference size, in which the slip area Ga is inscribed in the slip frame 112 and positioned at the center of the live view image G.

When the size of the slip area Ga becomes equal to or larger than the reference size as described above, the CPU 11 judges whether the second indicator 4 has been lit in green at this point (Step S11). That is, the CPU 11 judges whether the size of the slip area Ga has been judged to be equal to or larger than the reference size in the previous processing.

When the indicator has not been lit in green, that is, the indicator has been lit in red (NO at Step S11), the CPU 11 lights up the second indicator 4 in green (Step S12). In addition, by causing the sound emission section 20 to generate a predetermined notification sound, the CPU 11 notifies the user that the stipulated resolution can be ensured for an image of the slip (Step S13). The predetermined notification sound is a buzzer sound such as "blip, blip".

Then, the CPU 11 judges whether an imaging instruction from the user has been received. When no imaging instruction has been received (NO at Step S14), the CPU 11 returns to the processing at Step S3 to repeat it and the processing thereafter. That is, the CPU 11 maintains an imaging wait state.

If the second indicator 4 has been lit in green when the size of the slip area Ga becomes equal to or larger than the reference size (YES at Step S11), the CPU 11 skips each processing at Step S12 and Step S13 to immediately judge whether an imaging instruction has been received from the user (Step S14). Then, until an imaging instruction is received, the CPU 11 returns to the processing at Step S3 to repeat it and the processing thereafter (NO at Step S14).

When the size of the slip area Ga becomes smaller than the reference size before an imaging instruction is received from the user (NO at Step S6), the CPU 11 performs the processing at Step S8 to Step S10, that is, lights up the second indicator 4 in red, generates audio guidance prompting the adjustment of the viewing angle and the imaging distance, and thereby notifies the user that an image of the slip can no longer be recorded at the stipulated resolution.

When an imaging instruction is received from the user while the size of the slip area Ga is equal to or larger than the reference (YES at Step S14), the CPU 11 performs AF control in the camera section 19 (Step S15), performs imaging processing for slip image recording (Step S16), and temporarily stores the captured image in the image area 13c of the main storage device 13, as shown in FIG. 5 (Step S17).

Next, based on position information indicated by the slip information, the CPU 11 specifies a barcode area where the barcode 104 is present in the temporarily-stored captured image, and decodes the barcode by an image processing technique to acquire identification information formed of data characters of a prescribed number of digits (Step S18). Then, the CPU 11 stores the acquired identification information in the recording section 14 (Step S19).

In addition, the CPU 11 cuts out the slip area Ga recognized by the processing at Step S3 from the temporarily-stored captured image (Step S20), and stores an image of that area as a slip image in the recording section 14 (Step S21). Here, the identification information (data characters) acquired at Step S18 is provided as it is to the image file of the slip image as a file name, so that code information regarding the barcode and the slip image are associated with each other. Then, the CPU 11 ends the series of processing in the slip imaging mode.

As described above, in the slip processing device 1 operating in the slip imaging mode, the second indicator 4 is lit in red when a stipulated resolution cannot be ensured for a slip image, and is lit in green when the stipulated resolution can be ensured for a slip image. This allows the user to sequentially know whether a resolution for a slip image at that point satisfies the stipulated resolution and perform image capturing at appropriate imaging timing, whereby an image of the slip 101 can be reliably recorded at the stipulated resolution.

Also, at timing at which whether the stipulated resolution can be ensured for a slip image is judged for the first time and timing at which the judgment result is changed, the user is notified thereof by audio guidance and a notification sound. This also allows an image of the slip 101 to be reliably recorded at the stipulated resolution.

In the above-described configuration, the color of the light of the second indicator 4 is changed between red and green so as to allow the user to regularly know whether the stipulated resolution can be ensured for a slip image. However, a configuration may be adopted in which an indicator is provided for each state requiring notification and the user is notified of each state individually. In this configuration, the notification of each state by each indicator may be performed only when a current state is changed.

Also, in the above-described configuration, the user is notified of a judgment result as to whether the stipulated resolution can be ensured for a slip image, by the colors of the light of the second indicator 4, audio guidance, and a notification sound. However, a configuration may be adopted in which the user is notified only by the colors of the light or by audio guidance and a notification sound.

Moreover, a configuration may be adopted in which the display color of the guide frame 111 is changed instead of the color of the light of the second indicator 4. Also, a configuration may be adopted in which, when a judgment is made that a stipulated resolution can be ensured for a slip image, the guide frame 111 is temporarily blinked (the display and non-display thereof are alternately performed a predetermined number of times at predetermined time intervals) instead of a notification sound being generated. That is, in the slip imaging mode, the second indicator 4 is not necessarily required to be used, and the user may be notified of a judgment result as to whether a stipulated resolution can be ensured for a slip image, by only the guide frame 111.

In the present embodiment, the guide frame 111 is superimposed on the live view image G, and the minimum size of the slip 101 required to acquire the stipulated resolution is presented to the user. Therefore, only by adjusting the size of the slip 101 in the live view image G such that the slip 101 is inscribed in the slip frame 112 or becomes larger, the user can reliably record an image of the slip at the stipulated resolution. As a result of this configuration, a slip image can be reliably and easily captured.

Also, the display position of the guide frame 111 is adjusted in accordance with the position of the slip 101 in the live view image G. Specifically, the display position of the guide frame 111 is adjusted such that it is positioned close to the slip area Ga within a range where the entire guide frame 111 can be be displayed. This allows the user to more easily and quickly take a slip image.

Note that the guide frame 111 is to indicate to the user the minimum size of the slip 101 in the live view image G, and is not to indicate an area to be used (cutout) as a slip image. Therefore, there is no harm even if the positions of the slip area Ga and the guide frame 111 have been shifted from each other when an imaging instruction is provided. This also applies to a configuration in which, unlike the present embodiment, a captured image is stored as it is as a slip image.

Also, the guide frame 111 is only required to indicate the minimum size of the slip 101 in the live view image G to the user. Accordingly, for example, a configuration may be adopted where the barcode frame 113 and the slip detection points 114 are not used and only the slip frame 112 is used. Moreover, although the guide frame 111 is formed of a bold line in the present embodiment, it may be formed of a thin line as long as the guide frame 111 can be identified in the live view image G. Furthermore, the guide frame 111 may be configured such that only the four corners of the slip frame 112, that is, only the four corners of the area of the minimum size of the slip 101 are displayed.

In the present embodiment, it is only required that a stipulated resolution is ensured for a slip image (an image of a slip portion) to be finally stored. On the other hand, if a large image of the slip 101 more than required is captured, its data amount is needlessly increased. Therefore, another guide frame for indicating a recommended size of the slip area Ga, such as a rectangular frame surrounding the guide frame 111, may be displayed on the live view image G together with the guide frame 111, by which an unnecessary increase in the data amount of a slip image to be finally stored can be prevented.

In this case, by a configuration being adopted in which image capturing can be performed only when the size of the slip area Ga is equal to or larger than (inside) the guide frame 111 and equal to or smaller than the size of the above-described other guide frame, an unnecessary increase in the data amount of a slip image to be finally stored can be reliably prevented.

Figure 8:
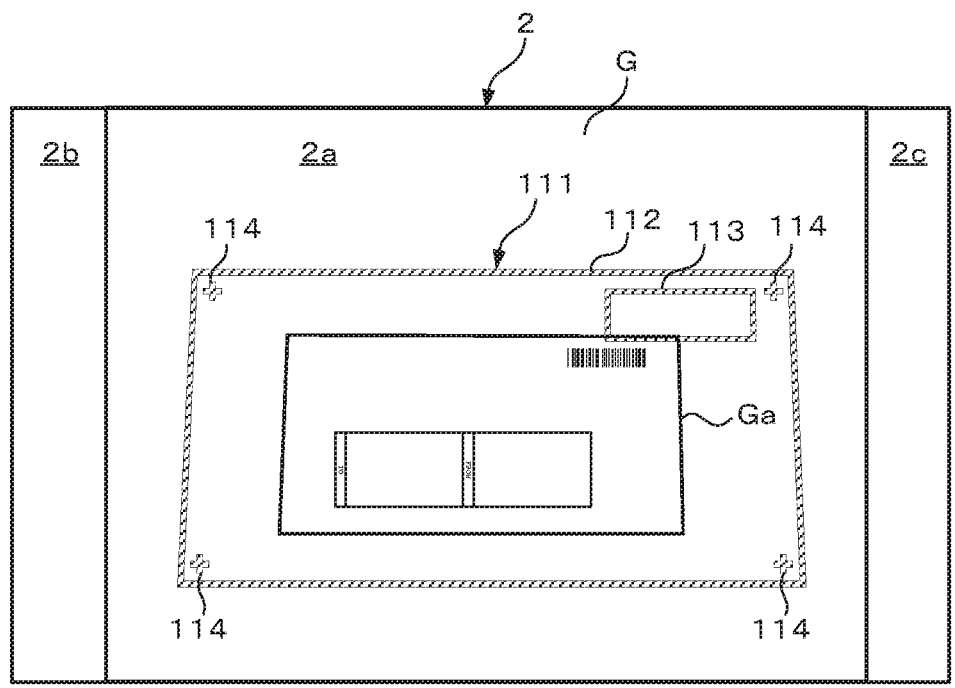
FIG. 8 is a diagram showing a modification example of a guide frame based on the shape of the slip area.

Also, the shape of the guide frame 111 is not necessarily required to be fixed, and may be deformed in accordance with the shape of the slip area Ga, as shown in FIG. 8. Note that, even when the slip area Ga is not in a normal shape (rectangle), an image of the slip can be recorded at the stipulated resolution if the number of pixels of each side of the slip area Ga is equal to or larger than the reference number of pixels.

Moreover, the guide frame 111 is not necessarily required to be displayed constantly, and a configuration may be adopted in which whether to display the guide frame 111 can be selected by the user as appropriate before the slip processing device 1 is used or during an operation of imaging the slip 101.

Furthermore, in the present embodiment, the guide frame 111 indicating the minimum size is superimposed on the live view image G as a guidance indication for the size adjustment of the slip 101 in the live view image G. However, the present invention is not limited thereto. The guide frame 111 can be replaced by another indication having a function to provide a guide for size adjustment. In this case, the indication may be superimposed on the live view image G, or may be displayed in the screen area 2b, 2c, or the like other than the screen center area 2a of the display 2 separately from the live view image G.

For example, as an indication for providing a guide for size adjustment, the minimum size (size of the number of pixels) of the slip 101 in the live view image G or its total number of pixels may be displayed together with the sequentially-changing size of the slip 101 or its total number of pixels, in numerical values. Also, as an indication for providing a guide for size adjustment, an indication clearly displaying a relation between the former size and the latter size to the user may be displayed.

Still further, in the present embodiment, the slip processing device 1 acquires identification information indicated by a barcode from a captured image of the slip 101. However, the present invention is not limited thereto. The slip processing device 1 may be structured to include a barcode reader dedicated for reading identification information from a barcode separately from the camera 7. Yet still further, in the present embodiment, the slip area Ga is cut out from a captured image and recorded as a slip image. However, a configuration may be adopted in which a captured image is recorded as it is.

Yet still further, in a configuration where the slip processing device 1 is used with it being constantly connected to the data management server 51, the slip processing device 1 is not required to record slip images, captured images, and the like, and acquired slip images, captured images, and the like may be immediately transmitted to the data management server 51.

B. Second Embodiment

Figure 10A:
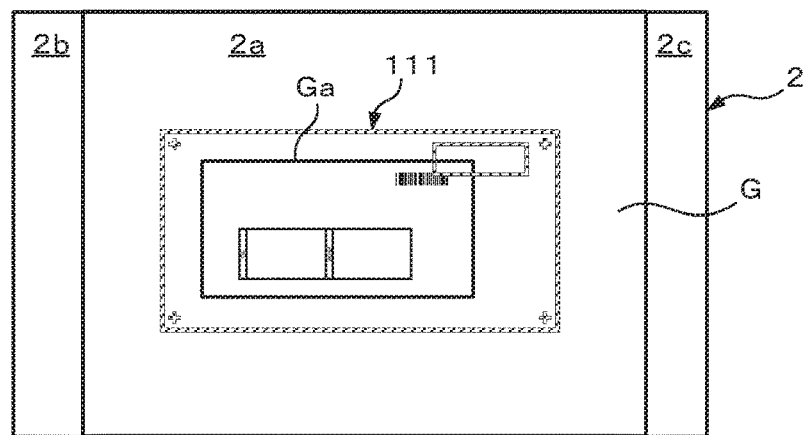
FIG. 10A to FIG. 10C are diagrams showing an example of a change in a live view image in the second embodiment.
Figure 10B:
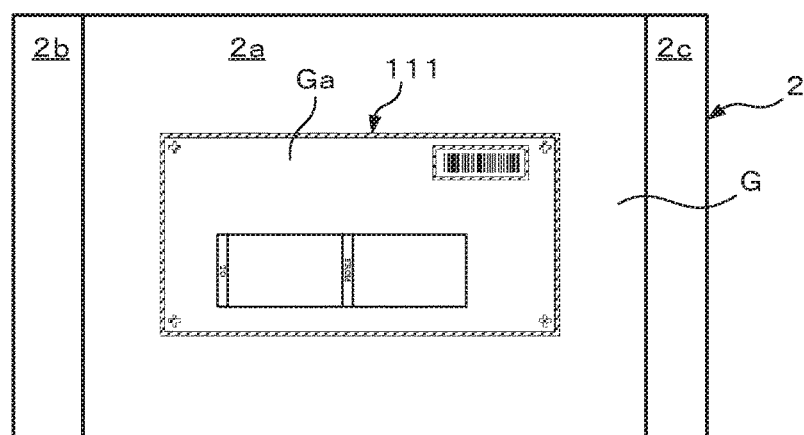
Figure 10C:
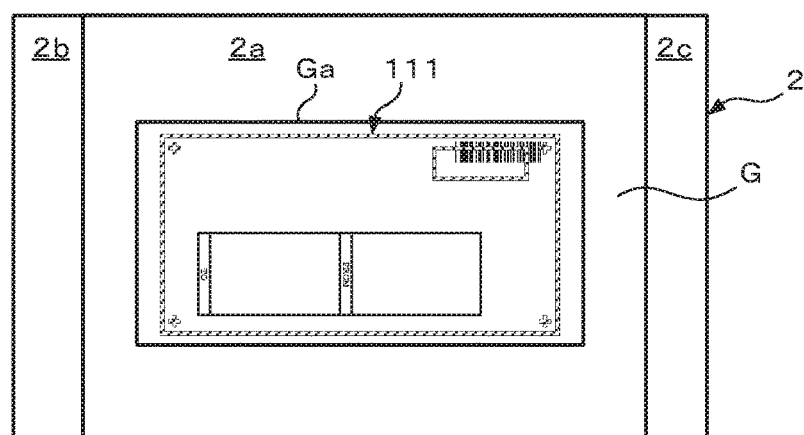

Next, a second embodiment of the present invention is described. In this embodiment, in the slip processing device 1 configured as described in the first embodiment, the CPU 11 performs processing of constantly and fixedly displaying the guide frame 111 irrespective of the position of the slip 101 (slip area Ga) in the live view image G. FIG. 10A to FIG. 10C are diagrams each showing an example of a change in the live view image G in the present embodiment. In the present embodiment, the guide frame 111 is displayed at the center of the live view image G (the screen center area 2a of the display 2).

Figure 9:
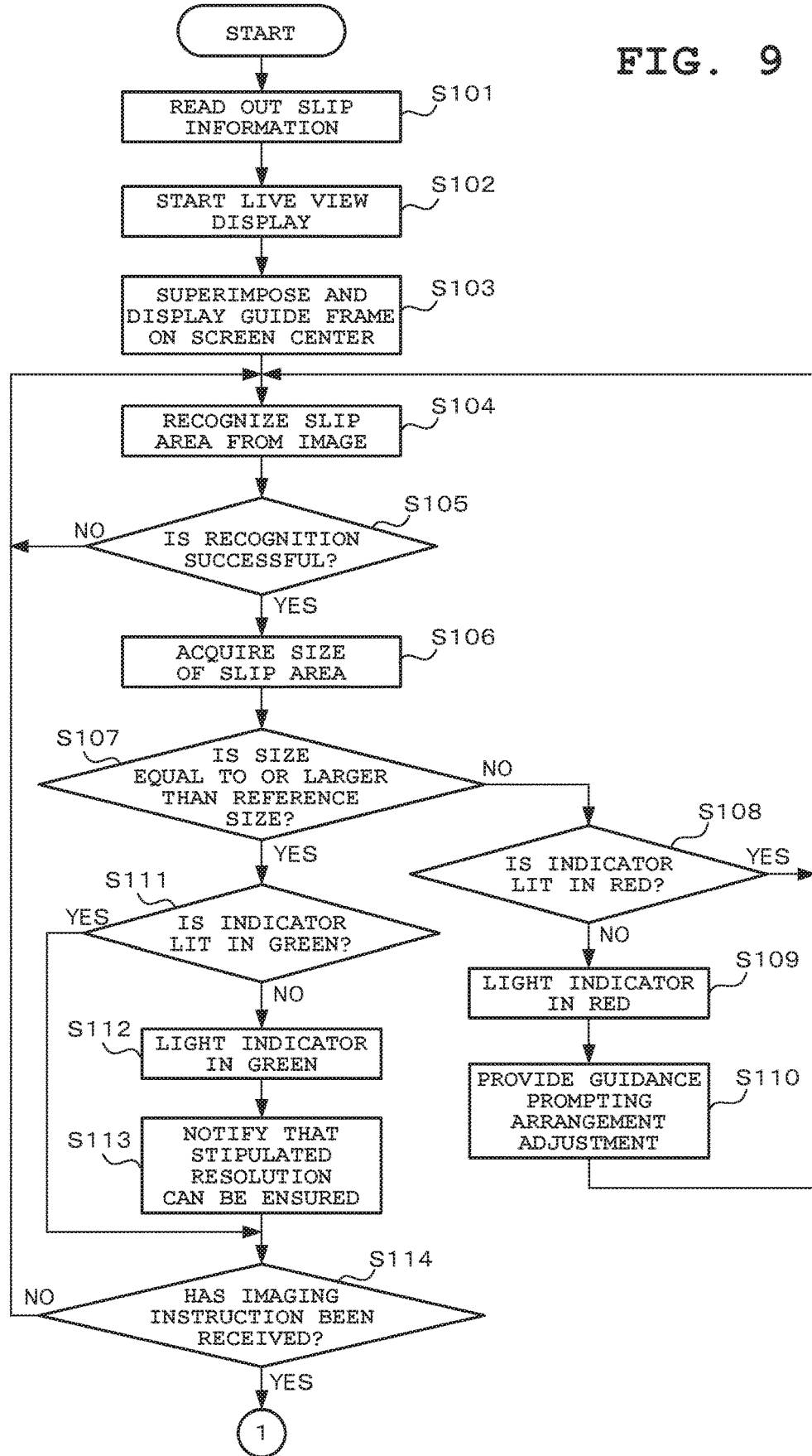
FIG. 9 is a flowchart of processing in a slip imaging mode in a second embodiment.

The processing of the CPU 11 in this embodiment is hereinafter specifically described with reference to FIG. 9.

In the present embodiment as well, when the processing is started upon power-up, the CPU 11 immediately reads out slip information of a slip specified in advance as an imaging target from the main storage device 13 (setting information area) (Step S101), and starts live view display (Step S102).

In the present embodiment, immediately after starting the live view display, the CPU 11 superimposes the guide frame 111 on the center of the live view image G (the screen center area 2a of the display 2) irrespective of the contents of the live view image G (Step S103).

Subsequently, the CPU 11 recognizes the slip area Ga in the live view image G for each frame sequentially captured (Step S104). Then, when the slip area Ga is recognized (YES at Step S105), the CPU 11 acquires the size of the recognized slip area Ga (Step S106), and judges whether its size is equal to or larger than the above-described reference size (Step S107).

Thereafter, the CPU 11 performs processing at Step S108 to Step S114 in accordance with the judgment result. Here, as evident from the drawing, the processing at Step S108 to Step S114 is the same as the processing at Step S8 to Step S14 shown in FIG. 4 in the first embodiment, and is therefore not described herein. As a result, in the present embodiment as well, image capturing can be performed only when a stipulated resolution can be ensured for a slip image.

Thereafter, when an imaging instruction is received from the user during a period in which the size of the slip area Ga in the live view image G is equal to or larger than the reference size (while the second indicator 4 is lit in green) (YES at Step S114), the CPU 11 performs the processing of FIG. 5 described in the first embodiment, and then ends the series of processing in the slip imaging mode.

As a result of the above-described configuration, in the present embodiment, when the user performs image capturing for the slip 101 while following the procedure described below, an image of the slip 101 can be reliably recorded at a stipulated resolution. First, the user adjusts the viewing angle and the imaging distance so that the slip area Ga comes within the guide frame 111 in the live view image G as shown in FIG. 10. Next, the user further adjusts the imaging distance so as to ensure that the slip area Ga internally fits in the guide frame 111 as shown in FIG. 10B or that the slip area Ga is larger than the guide frame 111 as shown in FIG. 10C. Then, in this state, the user performs image capturing.

Note that, in this embodiment as well, its configuration except the fixed display of the guide frame 111 can be changed as described in the first embodiment when necessary.

C. Third Embodiment

Next, a third embodiment of the present invention is described. In this embodiment, in the slip processing device 1 configured as described in the first embodiment, the CPU 11 performs processing of notifying the user of a judgment result as to whether a stipulated resolution can be ensured for a slip image, not by the display color of the second indicator 4 but by the display color of the guide frame 111.

Figure 12A:
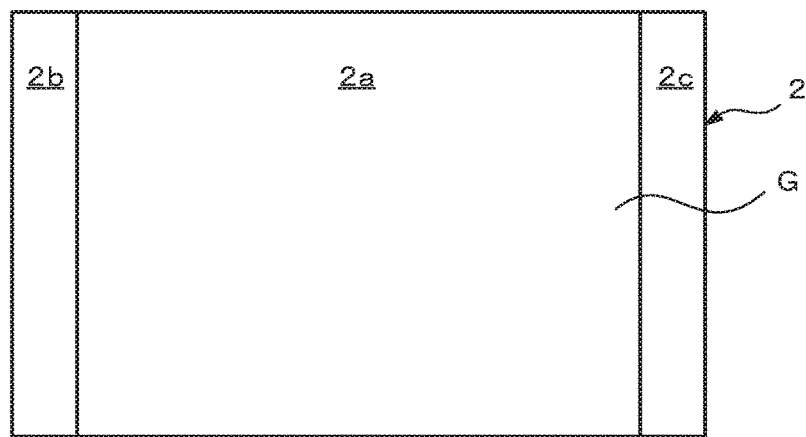
FIG. 12A to FIG. 12C are diagrams showing an example of a change in a live view image in the third embodiment.
Figure 12B:
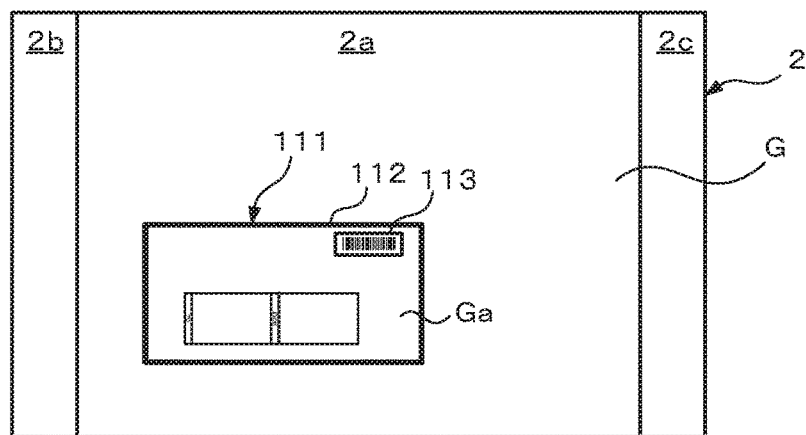
Figure 12C:
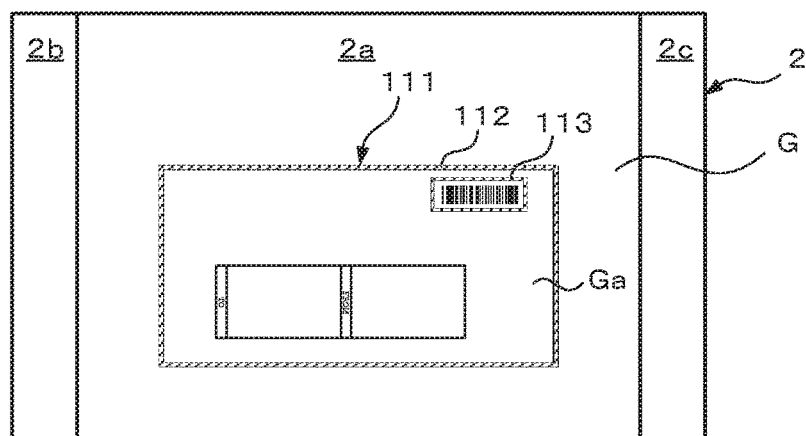

Here, differences between the present embodiment and the first and second embodiments are first described with reference to FIG. 12A to FIG. 12C. FIG. 12A to FIG. 12C are diagrams showing an example of a change in the live view image G in the present embodiment. In the present embodiment, until the slip 101 comes within the viewing angle, only the live view image G is displayed in the screen center area 2a of the display 2, as shown in FIG. 12A.

Also, while the slip area Ga is present in the live view image G, the guide frame 111 is superimposed on the live view image G, as shown in FIG. 12B and FIG. 12C. Here, the size of the guide frame 111 is sequentially changed so that the guide frame 111 externally fits on the slip area Ga, and its display position is controlled to follow the slip area Ga, whereby the guide frame 111 is controlled to always externally fits on the slip area Ga. In FIG. 12B and FIG. 12C, the slip detection points 114 of the guide frame 111 have been omitted.

Moreover, when the guide frame 111 is being displayed, the display color of the guide frame 111 is red (black in the drawing) if the size of the slip area Ga is smaller than the above-described reference size, as shown in FIG. 12B. Also, the display color of the guide frame 111 is green (hatched in the drawing) if the size of the slip area Ga is equal to or larger than the above-described reference size, as shown in FIG. 12C.

Figure 11:
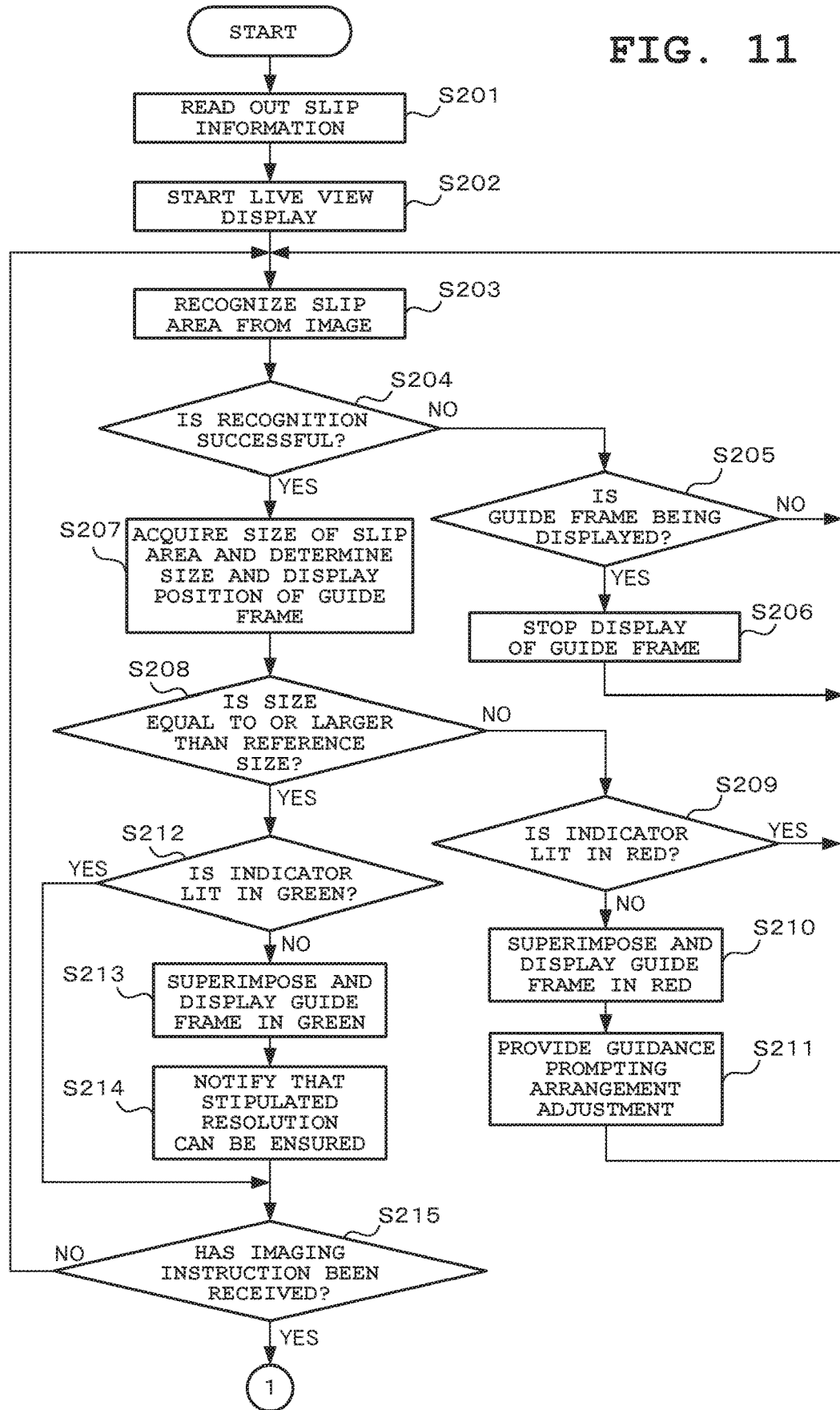
FIG. 11 is a flowchart of processing in a slip imaging mode in a third embodiment.

The processing of the CPU 11 in this embodiment is hereinafter specifically described with reference to FIG. 11. As evident from the drawing, the processing at Step S201 to Step S204 is the same as the processing at Step S1 to Step S4 shown in FIG. 4 in the first embodiment, and is therefore not described herein.

In the present embodiment, when the slip area Ga is recognized in the live view image G (YES at Step S204), the CPU 11 immediately acquires the size of the slip area Ga, and determines the size and the display position of the guide frame 111 (Step S206). Note that, here, a size at which the guide frame 111 externally fits on the slip area Ga is determined as the size of the guide frame 111, and a position where the guide frame 111 externally fits on the slip area Ga is determined as the display position of the guide frame 111. The guide frame 111 may be formed of a thin line and, in this case, the size of the guide frame 111 is equal to the size of the slip area Ga.

Next, the CPU 11 judges whether the size of the slip area Ga is equal to or larger than the above-described reference size (Step S208), and performs the following processing in accordance with the result.

First, when the size of the slip area Ga is not equal to or larger than the reference size (NO at Step S208) and the guide frame 111 is not being displayed in red at that point (NO at Step S209), the CPU 11 displays the guide frame 111 in red and superimposes it on the live view image G (Step S210). Here, the size and the display position of the guide frame 111 are the size and the position determined in the processing at Step S206.

Next, the CPU 11 controls the sound emission section 20 to output audio guidance which is the same as that in the first embodiment and prompts the user to adjust the viewing angle and the imaging distance (Step S211), and then returns to the processing at Step S203 to repeat it and the processing thereafter.

At Step S209, when the guide frame 111 is being displayed in red at that point (YES at Step S209), the CPU 11 omits the processing at Step S210 and Step S211 to immediately return to the processing at Step S203, and repeats it and the processing thereafter.

At Step S208, when the size of the slip area Ga is equal to or larger than the reference size (YES at Step S208) and the guide frame 111 is not being displayed in green at that point (NO at Step S209), the CPU 11 displays the guide frame 111 in green and superimposes it on the live view image G (Step S213). In this case as well, the size and the display position of the guide frame 111 are the size and the position determined in the processing at Step S206.

Then, the CPU 11 controls the sound emission section 20 to generate a predetermined notification sound which is the same as that in the first embodiment and notifies the user that a stipulated resolution can be ensured for a slip image (Step S214). Thereafter, the CPU 11 judges whether an imaging instruction has been received from the user. When no imaging instruction has been received (NO at Step S215), the CPU 11 returns to the processing at Step S203 to repeat it and the processing thereafter.

Conversely, when the guide frame 111 is being displayed in green (YES at Step S212), the CPU 11 omits the processing at Step S213 and Step S214 to immediately judge whether an imaging instruction has been received from the user. When no imaging instruction has been received (NO at Step S215), the CPU 11 returns to the processing at Step S203 to repeat it and the processing thereafter.

While the CPU 11 is repeating the processing at Step S203 and the processing thereafter, when the slip area Ga is no longer recognized in the live view image G (NO at Step S204) and the guide frame 111 is being displayed in red or green at that point (YES at Step S205), the CPU 11 once stops the display of the guide frame 111 (Step S206), and then returns to the processing at Step S203 to repeat it and the processing thereafter.

When an imaging instruction is received from the user while the size of the slip area Ga is equal to or larger the reference size (while the guide frame 111 is in green) (YES at Step S215), the CPU 11 performs the processing of FIG. 5 described in the first embodiment, and ends a series of processing in the slip imaging mode.

As described above, according to the present embodiment, the guide frame 111 is displayed in green (or is changed from red to green) when image capturing for the slip 101 is performed, which allows the user to know whether a resolution for a slip image satisfies a stipulated resolution. As a result, the image capturing can be performed at appropriate imaging timing, and an image of the slip 101 can be reliably recorded at the stipulated resolution.

Also, the size of the guide frame 111 is sequentially changed to a size at which the guide frame 111 externally fits on the slip area Ga (which may be a size equal to the size of the slip area Ga), and its display position follows the slip area Ga, whereby the guide frame 111 is controlled to always externally fit on the slip area Ga. This configuration allows the user to easily perform the size adjustment of the slip (the adjustment of the viewing angle and the imaging distance) regardless of the position of the slip area Ga in the live view image G.

Note that, in this embodiment as well, the shape of the guide frame 111 is not necessarily required to be fixed, and may be deformed in accordance with the shape of the slip area Ga as shown in FIG. 8.

Also, imaging targets in the present invention are not limited to the slip 101, and may be other ledger documents. Moreover, the present invention is not limited to a handy terminal and the like, and can be applied to other information terminal devices which capture an image of a ledger document and acquires its image information, such as a smartphone, tablet PC (Personal Computer), notebook PC, and PDA (Personal Digital Assistant).

While the present invention has been described with reference to the preferred embodiments, it is intended that the invention be not limited by any of the details of the description therein but includes all the embodiments which fall within the scope of the appended claims.

What is claimed is:

1. A ledger document processing device comprising:
   a display configured to display images captured by a camera at a predetermined frame rate while waiting for a ledger document to be captured; and
   a processor configured to:
      judge, for at least one of the images captured by the camera, whether a pixel-count size of an area corresponding to the ledger document in the at least one of the images captured by the camera, is equal to or larger than a reference pixel-count size;
      in response to judging that the pixel-count size of the area corresponding to the ledger document in the at least one of the images captured by the camera is equal to or larger than the reference pixel-count size, control the display to provide a predetermined notification of a first type; and
      after the predetermined notification of the first type is provided, receive an imaging instruction, control the camera to capture a ledger document image of the ledger document, and store in a storage the ledger document image captured by the camera in response to the imaging instruction,
   wherein the processor is configured to control the display to display:
      the at least one of the images captured by the camera; and
      an indication, superimposed on the at least one of the images captured by the camera, for providing a guide for size adjustment of the ledger document in the at least one of the images captured by the camera by movement of the camera relative to the ledger document to adjust the pixel-count size of the area corresponding to the ledger document in the at least one of the images captured by the camera to be equal to or larger than the reference pixel-count size.

2. The ledger document processing device according to claim 1,
   wherein the processor is configured to:
      judge, for each of the images captured by the camera, whether the pixel-count size of the area corresponding to the ledger document in the each of the images captured by the camera, is equal to or larger than the reference pixel-count size; and
      in response to judging that the pixel-count size of the area corresponding to the ledger document in the each of the images captured by the camera is equal to or larger than the reference pixel-count size, control the display to provide the predetermined notification of the first type.

3. The ledger document processing device according to claim 1,
   wherein the indication is an indication of a minimum size required for the pixel-count size of the area corresponding to the ledger document in the at least one of the images captured by the camera to be equal to or larger than the reference pixel-count size.

4. The ledger document processing device according to claim 3,
   wherein the indication is a guide frame circumscribed on an area equal to or larger than the reference pixel-count size.

5. The ledger document processing device according to claim 3,
   wherein the processor is configured to control the display to display the indication while adjusting a display position of the indication in accordance with a position of the ledger document in the at least one of the images captured by the camera.

6. The ledger document processing device according to claim 1,
   wherein the processor is configured to:
      in response to judging that the pixel-count size of the area corresponding to the ledger document in the each of the images captured by the camera is not equal to or larger than the reference pixel-count size, control the display to provide a predetermined notification of a second type.

7. The ledger document processing device according to claim 1,
wherein the processor is further configured to:
read a barcode on the ledger document from the ledger document image captured;
acquire identification information indicated by the barcode read; and
store the ledger document image in the storage in association with the identification information.

8. A ledger document processing method comprising:
controlling, by a processor, a display to display images captured by a camera at a predetermined frame rate while waiting for a ledger document to be captured;
judging, by the processor, for at least one of the images captured by the camera, whether a pixel-count size of an area corresponding to the ledger document in the at least one of the images captured by the camera, is equal to or larger than a reference pixel-count size;
in response to judging that the pixel-count size of the area corresponding to the ledger document in the at least one of the images captured by the camera is equal to or larger than the reference pixel-count size, controlling, by the processor, the display to provide a predetermined notification of a first type; and
after the predetermined notification of the first type is provided, receiving, by the processor, an imaging instruction, controlling, by the processor, the camera to capture a ledger document image of the ledger document, and storing, by the processor, in a storage the ledger document image captured by the camera in response to the imaging instruction,
wherein the ledger document processing method further comprises:
controlling, by the processor, the display to display:
the at least one of the images captured by the camera; and
an indication, superimposed on the at least one of the images captured by the camera, for providing a guide for size adjustment of the ledger document in the at least one of the images captured by the camera by movement of the camera relative to the ledger document to adjust the pixel-count size of the area corresponding to the ledger document in the at least one of the images captured by the camera to be equal to or larger than the reference pixel-count size.

9. The ledger document processing method according to claim 8, further comprising:
judging, for each of the images captured by the camera, whether the pixel-count size of the area corresponding to the ledger document in the each of the images captured by the camera, is equal to or larger than the reference pixel-count size; and
in response to judging that the pixel-count size of the area corresponding to the ledger document in the each of the images captured by the camera is equal to or larger than the reference pixel-count size, controlling the display to provide the predetermined notification of the first type.

10. The ledger document processing method according to claim 8,
wherein the indication is an indication of a minimum size required for the pixel-count size of the area corresponding to the ledger document in the at least one of the images captured by the camera to be equal to or larger than the reference pixel-count size.

11. The ledger document processing method according to claim 10,
wherein the indication is a guide frame circumscribed on an area equal to or larger than the reference pixel-count size.

12. The ledger document processing method according to claim 10, further comprising:
controlling, by the processor, the display to display the indication while adjusting a display position of the indication in accordance with a position of the ledger document in the at least one of the images captured by the camera.

13. The ledger document processing method according to claim 8, further comprising:
in response to judging that the pixel-count size of the area corresponding to the ledger document in the each of the images captured by the camera is not equal to or larger than the reference pixel-count size, controlling, by the processor, the display to provide a predetermined notification of a second type.

14. The ledger document processing method according to claim 8, further comprising:
reading, by the processor, a barcode on the ledger document from the ledger document image captured;
acquiring, by the processor, identification information indicated by the barcode read; and
storing, by the processor, the ledger document image in the storage in association with the identification information.

15. A non-transitory computer-readable storage medium having stored thereon a program that is executable by a computer in a ledger document processing device to actualize functions comprising:
controlling a display to display images captured by a camera at a predetermined frame rate while waiting for a ledger document to be captured;
judging, for at least one of the images captured by the camera, whether a pixel-count size of an area corresponding to the ledger document in the at least one of the images captured by the camera, is equal to or larger than a reference pixel-count size; in response to judging that the pixel-count size of the area corresponding to the ledger document in the at least one of the images captured by the camera is equal to or larger than the reference pixel-count size, controlling the display to provide a predetermined notification of a first type; and
after the predetermined notification of the first type is provided, receiving an imaging instruction, controlling the camera to capture a ledger document image of the ledger document, and storing in a storage the ledger document image captured by the camera in response to the imaging instruction,
wherein the program is executable by the computer to further actualize functions comprising:
controlling the display to display:
the at least one of the images captured by the camera; and
an indication, superimposed on the at least one of the images captured by the camera, for providing a guide for size adjustment of the ledger document in the at least one of the images captured by the camera by movement of the camera relative to the ledger document to adjust the pixel-count size of the area corresponding to the ledger document in the at least one of the images captured by the camera to be equal to or larger than the reference pixel-count size.

16. The non-transitory computer-readable storage medium according to claim 15, wherein the program is executable by the computer to further perform:
in response to judging that the pixel-count size of the area corresponding to the ledger document in the each of the images captured by the camera is not equal to or larger than the reference pixel-count size, controlling the display to provide a predetermined notification of a second type.

17. The non-transitory computer-readable storage medium according to claim 15, wherein the program is executable by the computer to further perform:
reading a barcode on the ledger document from the ledger document image captured;
acquiring identification information indicated by the barcode read; and
store the ledger document image in the storage in association with the identification information.

\* \* \* \* \*